No. 783,882. PATENTED FEB. 28, 1905.
F. A. MERSHON.
SHAFT COUPLING.
APPLICATION FILED AUG. 5, 1904.
2 SHEETS—SHEET 1.
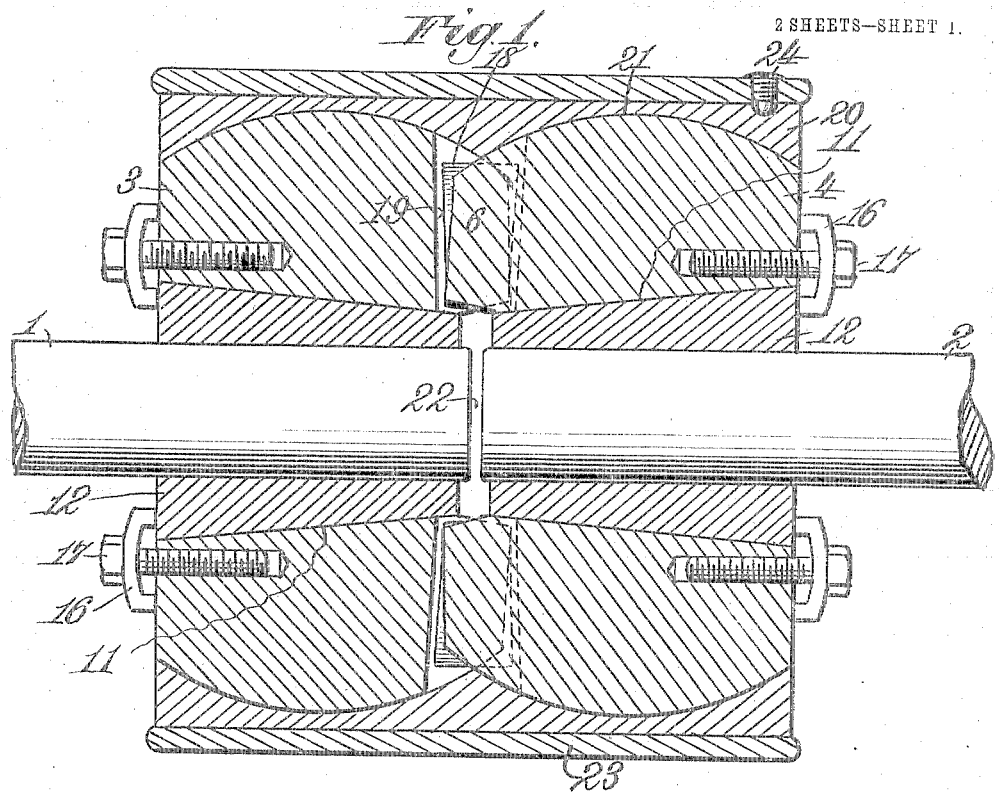
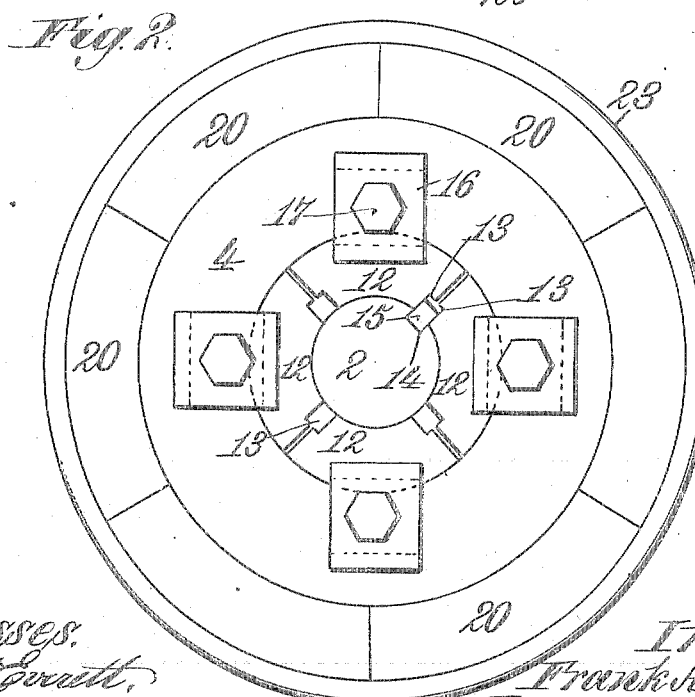
Witnesses:
Robert Everett,
James L. Norris, Jr.
Inventor:
Frank A. Mershon,
By James L. Norris,
Atty.

No. 783,882. PATENTED FEB. 28, 1905.
F. A. MERSHON.
SHAFT COUPLING.
APPLICATION FILED AUG. 5, 1904.

2 SHEETS—SHEET 2.

Witnesses.
Robert Everett.
James L. Norris, Jr.

Inventor.
Frank A. Mershon.
By James L. Norris.
Atty.

No. 783,882. Patented February 28, 1905.

UNITED STATES PATENT OFFICE.

FRANK A. MERSHON, OF GERMANTOWN, PENNSYLVANIA.

SHAFT-COUPLING.

SPECIFICATION forming part of Letters Patent No. 783,882, dated February 28, 1905.

Application filed August 5, 1904. Serial No. 219,679.

*To all whom it may concern:*

Be it known that I, FRANK A. MERSHON, a citizen of the United States, residing at Germantown, in the county of Philadelphia and State of Pennsylvania, have invented new and useful Improvements in Shaft-Couplings, of which the following is a specification.

This invention relates to a shaft-coupling having an organization of elements for yieldingly connecting the extremities of shafts for reliably transmitting motion from one of the latter to the other, or the coupling may be used for connecting a plurality of shafts.

The improved coupling not only serves to positively connect extremities of shafts, but also operates to prevent the weight from being thrown back upon the engine in the starting operation with material advantages and further compensates for wear of bearings or settling of supports by an automatic adjustment of the parts thereof to irregularities in longitudinal alinement without detracting from the effective motion or power of the coupled shafts.

The improved coupling also obviates fracture of the shafts connected thereto by sudden torsional twists, and being practically of a universal-joint arrangement the shaft extremities disposed at an angle may at times be attached thereby.

Structurally the several parts of the coupling are simple and may be expeditiously associated and disorganized.

With these and other advantages in view the invention consists in the construction and arrangement of parts, which will be more fully hereinafter set forth.

Figure 3:
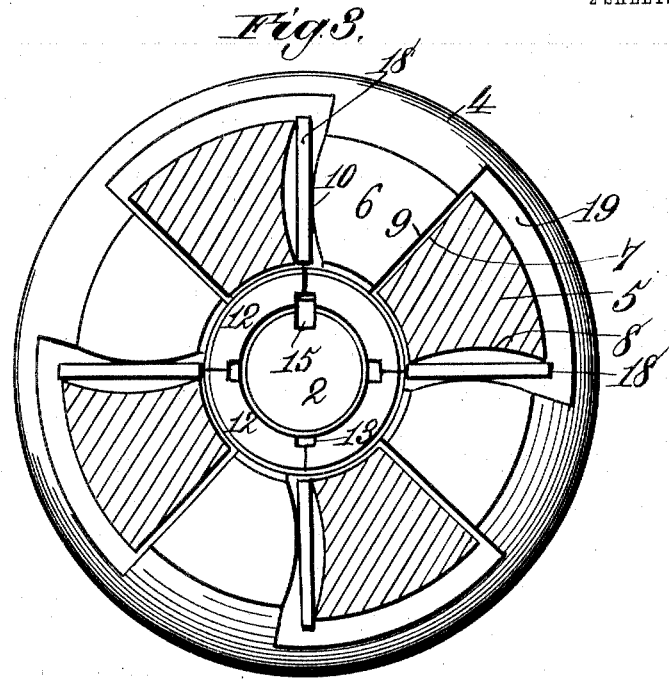
Figure 4:
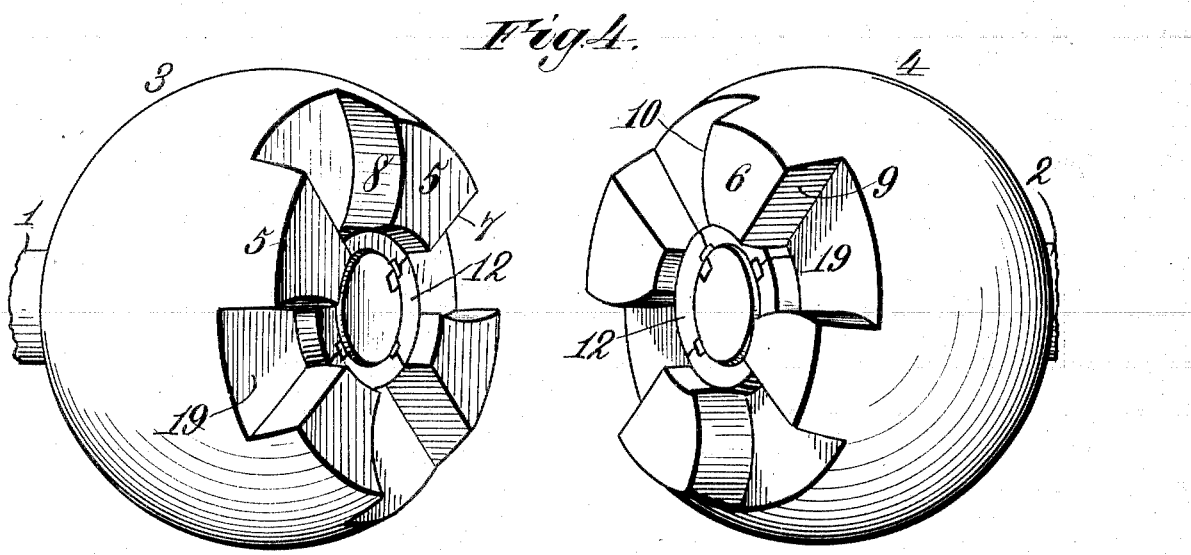

In the drawings, Figure 1 is a longitudinal vertical section of a shaft-coupling embodying the features of the invention and shown applied to shaft extremities. Fig. 2 is an end elevation of the same. Fig. 3 is a transverse vertical section taken about centrally therethrough. Fig. 4 shows detail perspective views of the main coupling members.

Similar numerals of reference are employed to indicate corresponding parts in the several views.

The numerals 1 and 2 designate shaft extremities to which the improved coupling is shown applied. The coupling essentially comprises two main members 3 and 4, which are spherical in form and have inner opposing coupling faces or terminals respectively provided with segmental projections 5 and 6, each of the projections 5 having one side edge 7 straight and the opposite side edge 8 concaved. The projections 6 each have one side edge 9 straight and the opposite side edge 10 convex, and when the two members 3 and 4 are assembled the projections 5 and 6 interlock and the concave edges 8 of the projections 5 are disposed adjacent to the convex edges 10 of the projections 6, whereas the straight side edges 7 and 9 of both sets of projections are contiguously disposed. Each of the members 3 and 4 has an inwardly-tapered central bore 11, as clearly shown by Fig. 1, said bore being materially greater in diameter throughout its length than the diameter of the shaft extremity to which it is applied, and in the said bores segmental wedges 12 are inserted from the outer ends of the members flush with the said ends, these wedges 12 serving as inner bushings.

To lock the wedges 12 to the shaft extremities 1 and 2, the contiguous ends thereof adjacent to said shaft extremities are formed with key-seats 13, half of the seat being formed in each end of the contiguous ends of the wedges. The shaft extremities also have key-grooves 14, one in each, and after the wedges 12 have been assembled around the shaft extremities within the members 3 and 4 a single key 15 is longitudinally inserted in the key-seat 13 coinciding with the key-groove 14, the purpose of having a number of the key-seats 13 being to permit the coupling to be applied expeditiously and conveniently without requiring turning of the parts to bring a single key-seat in coincidence with the key-groove of the shaft extremity, and thereby avoid considerable delay in associating the parts of the coupling with a shaft extremity. When the key 15 has been inserted in one of the key-seats 13 and the key-groove 14, the remaining wedges are spread or jammed thereby, so as to unitedly act as a securing means between the coupling members 3 and 4 and the shaft extremities.

The inner edges of the wedges 12 are longitudinally straight and the outer edges inclined, and conjointly the series of wedges form an inner seat which facilitates the operation of the members 3 and 4, as will be more fully hereinafter explained. To prevent the wedges 12 from having endwise movement after they have been applied, they are each engaged by one terminal of a bridge cap or spanner 16, the opposite ends of the bridge-caps bearing upon an adjacent portion of the outer ends of the members 3 and 4, and said caps are held in place by screws 17, inserted centrally therethrough and into the said members 3 and 4.

Inserted radially between the opposing concave edges 8 and convex edges 10 of the projections 5 and 6 of the respective members 3 and 4 are spring plates or restorers 18, which are perfectly flat, and each plate has bearing at opposite ends on one side against the terminals of the concave edge 8 and at the intermediate portion of the opposite side against the convex edge 10. These spring plates or restorers permit a yielding movement of the two members 3 and 4 with respect to each other, especially in the initial or starting operation of the shafts, and prevent the weight of the latter from being thrown back upon and straining the engine or motor, and after regular rotation ensues the parts will assume a normal position, due to the resiliency of the said plates, or when subjected at any time to a similar operation when a torsional or excessive resistance is set up in the coupled shafts to avoid fracture of the latter and undue strain on the motor. The plates or restorers 18 are tapered longitudinally toward their outer ends, as shown by Fig. 1, and the outer walls 19 between the projections 5 and 6 of the members 3 and 4 are reversely inclined to compensate for a sagging movement of the coupled shafts, which may result from settling of the supports thereof after continued use or wear of the bearings, and, further, in some instances this construction adapts the coupling to be used with shafts normally disposed at an angle with respect to each other instead of in true longitudinal relation, as shown by Fig. 1.

To complete the universal-joint organization of the coupling, outer segmental sections 20 are regularly applied around the members 3 and 4 and unitedly provide an outer bushing or casing. Each segmental section 20 extends fully over the two members 3 and 4 in a longitudinal direction and is formed with two inner concave seats 21 to receive the two members and permit the latter to move inwardly toward each other in the event that the coupled shafts sag or become depressed, as heretofore explained. The coupled extremities of the shafts have their inner ends normally spaced apart from each other, as at 22, to allow a sagging movement in the event of wear of the bearings or settling of the supports therefor, and thereby avoid jamming of the shaft ends and inefficiency in their operation, which would be present without the means set forth for compensating for such irregular position.

The entire coupling is inclosed by a cylindrical covering or band 23, which is continuous and held applied by a single securing-screw 24, penetrating one of the sections 20. In view of the fact that all of the sections 20 are located over the members 3 and 4 it will only be necessary to use one fastening-screw 24 to hold the cylindrical casing or band 23 in place. The cylindrical casing or band 23 is applied endwise over the sections 20 and holds the latter in close relation to the members 3 and 4, and in view of the corresponding arcuate construction of the seats 21 and the outer surfaces of the members 3 and 4, the said sections 20, as well as the members, will be prevented from having endwise movement or becoming accidentally dissasociated. Hence the coupling when applied will remain in positive position over the connected extremities of the shafts. At any time the cylindrical casing or band 23 may be withdrawn by releasing the fastening-screw 24, the sections 20 lifted outwardly from the members 3 and 4, and the latter released by withdrawing the screws 17 and the wedges 12.

In applying the coupling the members 3 and 4 will be first slipped longitudinally over the shaft extremities into coupling relation or so that the projections 5 and 6 will interlock, and following this operation the wedges are inserted and secured by the means set forth, the spring plates or restorers 18 interposed between the edges of the projections, and the sections 20 and cylindrical casing or band 23 consecutively applied, as set forth.

It will be understood that the parts of the coupling will be constructed of metal best adapted for the purpose, and, as before explained, a number of the couplings may be applied to a line of shafting to connect up several lengths with the advantages heretofore noted.

By having the contiguous edges or side walls of the projections 5 and 6 respectively concaved and of convex contour and engaging the spring plates or restorers 18 in a manner heretofore set forth the said plates are permitted to yield in opposite directions to compensate for opposite tonsional twists, and the said plates will also be more effective in their resilient operation. It will also be understood that changes in the proportions, dimensions, and minor details may be resorted to without departing from the spirit of the invention.

Having thus fully described the invention, what is claimed as new is—

1. In a shaft-coupling, the combination with shafts, of interlocking spherical members surrounding the ends of said shafts and having reversely-inclined contiguous edges, and means for holding the said members in connected relation and permitting them to have an unrestricted movement with respect to each other to allow the shaft ends to automatically adjust themselves.

2. In a shaft-coupling, the combination with shafts, of main members having interlocking projections on their inner opposing faces with reversely-inclined edges, part of the latter being straight and a portion curved, and means for holding the said members in movable relation to each other.

3. In a shaft-coupling, the combination with shafts having their terminals spaced apart from each other, of spherical members having means at their inner opposing faces with reversely-inclined edges, part of the latter being straight and a portion curved and interlocking with each other, and devices for holding the said members in unrestricted relation with respect to each other to allow the shafts to be automatically adjusted.

4. In a shaft-coupling, the combination of shafts, of main members having inner opposing interlocking faces and inwardly-tapering bores, the greatest diameter of the bores being at the outer ends of the members, wedges longitudinally inserted through the said bores and engaging the shafts and forming inclined surfaces for the movements of the members to more firmly interlock the latter at their inner ends, and outer means for holding the members in assembled relation and forming seats therefor.

5. In a shaft-coupling, the combination with shafts, of main spherical members having inner opposing interlocking faces reversely inclined with respect to each other, means engaging the outer ends of the said members to connect the latter to the shaft ends, and outer sections held in close relation to the members and having concave seats therefor in which the spherical portions of said members operate.

6. In a shaft-coupling, the combination with shafts, of main spherical members disposed over the said shafts and having inner interlocking projections, the projections of one member having concave edges disposed opposite convex edges of the projections of the opposite member, yielding elements interposed between the concave and convex edges of the projections, and means for holding the members in associated relation with respect to each other and to the shafts.

7. In a shaft-coupling, the combination with shafts, of main coupling members of spherical form disposed thereover and having inner opposing interlocking projections, the projections of one member having concave faces disposed opposite the convex faces of the projections of the opposite member, resilient elements radially interposed between the convex edges of the projections of one member and the concave edges of the projections of the opposite member, sufficient play being permitted between the said projections and the elements to permit the members to assume the position other than that in direct longitudinal alinement.

8. In a shaft-coupling, the combination with shafts, of main coupling members having a spherical contour and provided with interlocking projections at their inner opposing terminals, yielding plates interposed between said projections, and means for holding the members in assembled relation with respect to the shafts.

9. In a shaft-coupling, the combination with shafts, of main coupling members of spherical contour having inner interlocking devices, resilient means interposed between the said devices, and means for holding the said members in assembled relation to the shafts.

10. In a shaft-coupling, the combination with shafts, of main coupling members having an outer spherical contour, resilient devices interposed between the inner opposing terminals of the said members, and means for retaining the members in association with the shafts and shaped to permit movement of the said members.

11. In a shaft-coupling, the combination with shafts, of main coupling members having an outer spherical contour, and formed with inwardly-contracted central bores and interlocking projections at their inner ends, the outer walls between the projections being outwardly inclined, resilient elements interposed between the projections and converged toward their outer extremities, and inner and outer means for holding the members in assembled relation with respect to the shafts.

12. In a shaft-coupling, the combination with shafts, of main coupling members having interlocking means at their inner opposing ends, the walls between the interlocking means being outwardly inclined toward the ends of the members, resilient elements radially interposed between the said means and tapered toward their outer ends, and devices for holding the members in assembled relation with respect to the shafts.

13. In a shaft-coupling, the combination with shafts, of main coupling members having inner interlocking terminals and formed with conical bores tapering toward the inner extremities thereof, wedges inserted in the said bores, a key inserted between a portion of the said wedges, and outer holding means for the members.

14. In a shaft-coupling, the combination with shafts, of main coupling members having inner interlocking terminals and inwardly-tapering conical bores, segmental wedges inserted in the said bores, the contiguous edges of the wedges being formed with key-seats and each of the shafts provided with a single key-groove, a key inserted in one of the key-seats to lock each member to one shaft, and outer holding means for the members.

15. In a shaft-coupling, the combination with shafts, of coupling members having bores therein of greater diameter than the shafts which they engage, the inner ends of the members engaging each other, wedges interposed between the members and shafts, bridge devices engaging the ends of the wedges and members and secured to the latter, and outer holding means for the members.

16. In a shaft-coupling, the combination with shafts, of coupling members having bores through which the shafts extend of greater diameter than the latter, the inner ends of the members being in interlocking engagement with each other, bridge devices terminally engaging the ends of the wedges and the members, screws extending through the bridge devices into the members, and outer holding means for the latter.

17. In a shaft-coupling, the combination with shafts, of main coupling members having inner interlocking ends and outer spherical surfaces, holding-sections engaging the outer spherical surfaces of the members and provided with concave seats, means for inclosing the said sections, the inner interlocking ends of the members being spaced apart for free movement to compensate for sagging of the shafts, and means for locking the members to the shafts.

18. In a shaft-coupling, the combination with shafts, of coupling members secured to the said shafts and having inner engaging ends and outer spherical surfaces, segmental sections extending full length of the members and provided with concave seats to receive the said surfaces, inwardly-reduced reversely-arranged wedges between the members and the shafts, the inner ends of the members being arranged to have movement with relation to each other, and means for holding the sections applied to the members.

19. In a shaft-coupling, the combination with shafts, of main coupling members having inner interlocking extremities movable in relation to each other and provided with outer arcuate surfaces, inwardly-reduced reversely-arranged wedge devices for locking the members to the shafts, segmental sections applied over the arcuate surfaces and each having two concave seats to engage the members, the sections extending full length of the latter, and an inclosing band secured to one of the sections.

In testimony whereof I have hereunto set my hand in presence of two subscribing witnesses.

FRANK A. MERSHON.

Witnesses:
WILLIAM K. SHRYOCK,
JOHN LITTLE.